(12) United States Patent
Manning et al.

(10) Patent No.: US 7,551,915 B1
(45) Date of Patent: Jun. 23, 2009

(54) METHOD OF ESTABLISHING ROUTE OPTIMIZED COMMUNICATION IN MOBILE IPV6 BY SECURING MESSAGES SENT BETWEEN A MOBILE NODE AND HOME AGENT

(75) Inventors: Serge M. Manning, Overland Park, KS (US); Charles Brent Hirschman, Overland Park, KS (US); Mark A. Lipford, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 536 days.

(21) Appl. No.: 11/409,700

(22) Filed: Apr. 24, 2006

(51) Int. Cl.
H04M 1/66 (2006.01)
H04M 1/665 (2006.01)
H04K 1/00 (2006.01)
H04L 9/00 (2006.01)

(52) U.S. Cl. .................. 455/411; 455/410; 380/247; 380/270; 380/277; 713/171; 713/172

(58) Field of Classification Search .................. 455/411
See application file for complete search history.

(56) References Cited

U.S. PATENT DOCUMENTS

2003/0211842 A1* 11/2003 Kempf et al. ............... 455/411
2004/0179688 A1* 9/2004 Lee ........................... 380/270
2004/0236937 A1* 11/2004 Perkins et al. .............. 713/150
2006/0120315 A1* 6/2006 Olivereau et al. ........... 370/313
2006/0227971 A1* 10/2006 Haddad ...................... 713/171
2006/0256762 A1* 11/2006 Patel et al. .................. 370/338
2007/0025309 A1* 2/2007 Yano et al. .................. 370/338
2007/0091843 A1* 4/2007 Patel et al. .................. 370/331

FOREIGN PATENT DOCUMENTS

EP         1394982 A1 *  3/2004

OTHER PUBLICATIONS

C. Perkins, "IP Mobility Support," Request for Comments 2002, Oct. 1996.
H. Krawczyk, et al., "HMAC: Keyed-Hashing for Message Authentication," Request for Comments 2104, Feb. 1997.
R. Rivest, "A Description of the RC2(r) Encryption Algorithm," Request for Comments 2268, Mar. 1998.
S. Kent, et al., "IP Encapsulating Security Payload (ESP)," Request for Comments 2406, Nov. 1998.

(Continued)

*Primary Examiner*—Nick Corsaro
*Assistant Examiner*—Tangela T. Chambers (57) ABSTRACT

A mobile node that is in communication with a correspondent node via a home agent initiates a process for establishing a route optimized mode of communication between the mobile node and the correspondent node. The mobile node sends a first initiating message to the home agent for delivery to the correspondent node and sends a second initiating message directly to the correspondent node. The mobile node secures the first initiating message by including an initiating-message authentication code that can be validated by the home agent or by an authentication server. The correspondent node responds by sending a first responsive message to the home agent for delivery to the mobile node and by sending a second responsive message directly to the mobile node. The home agent secures the first responsive message by adding a responsive-message authentication code that can be validated by the mobile node.

18 Claims, 4 Drawing Sheets

OTHER PUBLICATIONS

A. Conta, et al., "Generic Packet tunneling in IPv6 Specification," Request for Comments 2473, Dec. 1998.

C. Rigney, et al., "Remote Authentication Dial in User Service (RADIUS)," Request for Comments 2865, Jun. 2000.

D. Johnson, et al., "Mobility Support in IPv6," Request for Comments 3775, Jun. 2004.

P. Nikander, et al., "Mobile IP Version 6 Route Optimization Security Design Background," Request for Comments 4225, Dec. 2005.

A. Patel, et al., "Mobile Node Identifier Option for Mobile IPv6 (MIPv6)" Request for Comments 4283, Nov. 2005.

A. Patel, et al., "Authentication Protocol for Mobile IPv6," Request for Comments 4285, Jan. 2006.

S. Kent, et al., "Security Architecture for the Internet Protocol," Request for Comments 4301, Dec. 2005.

Charles E. Perkins, "Securing Mobile IPv6 Route Optimization Using a Static Shared Key," Internet Draft, Oct. 2005.

U.S. Department of Commerce, National Institute of Standards and Technology, "Secure Hash Standard," Federal Information Process Standards Publication, FIPS Pub 180-1, Apr. 17, 1995.

D. Harkins and D. Carrel, "The Internet Key Exchange (IKE)," Request for Comments 2409, Nov. 1998.

* cited by examiner

METHOD OF ESTABLISHING ROUTE OPTIMIZED COMMUNICATION IN MOBILE IPV6 BY SECURING MESSAGES SENT BETWEEN A MOBILE NODE AND HOME AGENT

BACKGROUND

1. Field of the Invention

The present invention relates to telecommunications and, more particularly, to a method for secure route optimization in Mobile IPv6.

2. Description of Related Art

Mobile IP has been used to allow mobile nodes to remain reachable when they move around in an Internet Protocol (IP) network. The basic Mobile IP approach is described in C. Perkins, "IP Mobility Support," Request for Comments 2002, October 1996. In this approach, a mobile node is assigned a home address that routes to a home agent. When the mobile node is away from its home network, the mobile node registers a care-of address with the home agent. Then, when the home agent receives packets addressed to the mobile node's home address, the home agent forwards the packets to the mobile node's care-of address. In this way, the mobile node can remain reachable at its home address even when its point of attachment to the IP network changes.

The Mobile IP approach has also been adapted for IPv6 networks. The basic Mobile IPv6 approach is described in D. Johnson et al., "Mobility Support in IPv6," Request for Comments 3775, June 2004 (hereinafter "RFC 3775"), which is incorporated herein by reference. When a mobile node is away from its home network, Mobile IPv6 supports two possible modes of communication between the mobile node and a correspondent node, i.e., the node with which the mobile node is communicating. These two possible modes of communication are illustrated schematically in FIG. 1. In the first communication mode, indicated by the arrows labeled "1a" and "1b," the mobile node and correspondent node exchange packets via the home agent. More particularly, the correspondent node sends packets to the mobile node's home address, and the packets are routed to or intercepted by the home agent. The home agent then tunnels the intercepted packets to the mobile node's care-of address. The tunneling is performed using IPv6 encapsulation, such as described in A. Conta and S. Deering, "Generic Packet Tunneling in IPv6 Specification," Request for Comments 2473, December 1998, which is incorporated herein by reference. Going in the other direction, the mobile node sends packets to the correspondent node by reverse tunneling the packets to the home agent using IPv6 encapsulation. The home agent then decapsulates the packets and passes them to the correspondent node.

Figure 1:
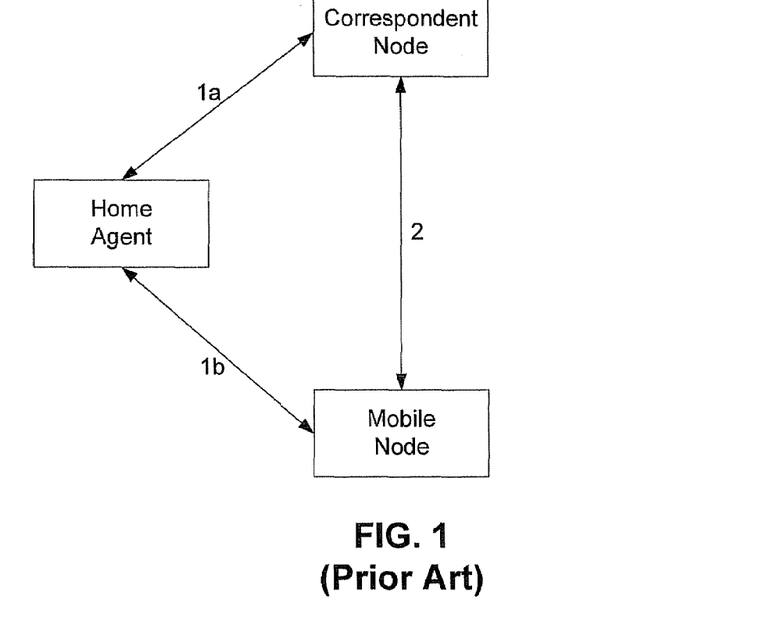
FIG. 1 is a block diagram schematically illustrating two possible modes of communication between a mobile node and a correspondent node in Mobile IPv6.

In the second communication mode, indicated by the arrow labeled "2" in FIG. 1, the mobile node and correspondent node exchange packets without going through the home agent. The correspondent node sends packets to the mobile node's care-of address, and the mobile node sends packets to the correspondent node's IPv6 address. The second communication mode is described as a "route optimized" mode because it can provide a more direct communication path between the mobile node and the correspondent node. Route optimized communication is often desirable because it can result in reduced latency and improved reliability.

A Return Routability procedure may be used to establish route optimized communication between a mobile node and a correspondent node. In this procedure, the mobile node sends a Home Test Init (HoTI) message and a Care-of Test Init (CoTI) message, and the correspondent node responds by sending a Home Test (HoT) message and a Care-of Test (CoT) message. The mobile node then sends a Binding Update (BU) message that authorizes the correspondent node to send packets to the mobile node's care-of address, and the correspondent node acknowledges with a Binding Acknowledgement (BA) message.

Figure 2:
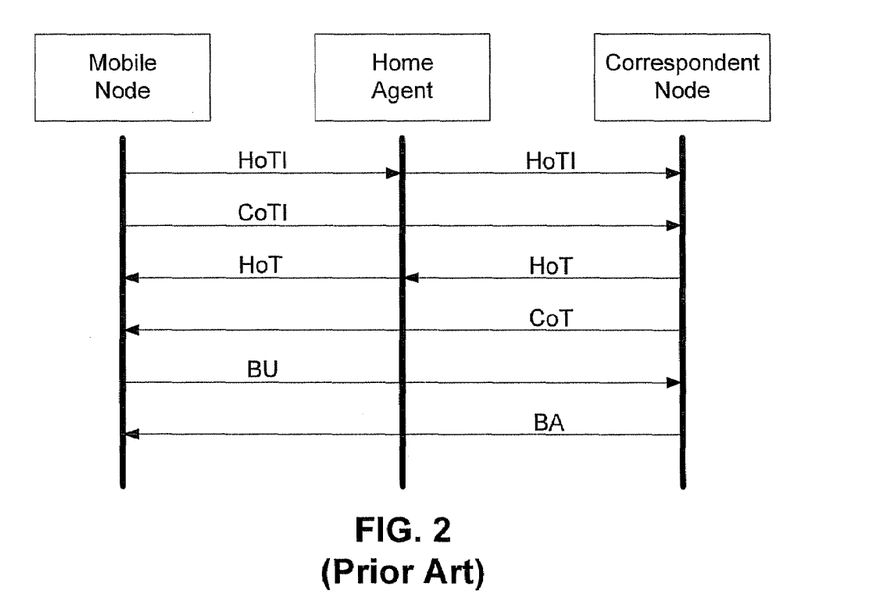
FIG. 2 is a block diagram illustrating a message flow for a Return Routability procedure for establishing a route optimized mode of communication in Mobile IPv6.

The sequence of these messages is illustrated in FIG. 2. The mobile node initiates the Return Routability procedure by sending the HoTI and CoTI messages in parallel. As illustrated in FIG. 2, the mobile node reverse tunnels the HoTI message to the home agent for delivery to the correspondent node, whereas the mobile node sends the CoTI message to the correspondent node directly. The HoTI message conveys the mobile node's home address to the correspondent node. The HoTI message also includes a "home init cookie," which the correspondent node is supposed to send back for verification. The CoTI message conveys the mobile node's care-of address to the correspondent node. The CoTI message also includes a "care-of init cookie," which the correspondent node is supposed to send back for verification. The home init and care-of init cookies are 64-bit random numbers generated by the mobile node.

The correspondent node sends the HoT message in response to the HoTI message and sends the CoT message in response to the CoTI message. The HoT message includes the home init cookie provided by the mobile node and also includes a "home keygen token." The home keygen token is a 64-bit value that the correspondent node generates by applying a hash function to input data that includes the mobile node's home address and the correspondent node's secret key, Kcn. The CoT message includes the care-of init cookie provided by the mobile node and also includes a "care-of keygen token." The care-of keygen token is a 64-bit value that the correspondent node generates by applying a hash function to input data that includes the mobile node's care-of address and Kcn.

The mobile node receives the HoT and CoT messages and verifies that the messages include the home init and care-of init cookies. With this verification complete, the mobile node prepares to send a BU message to the correspondent node to authorize the correspondent node to send packets to the mobile node's care-of address. To prepare the BU message, the mobile node hashes the home keygen and care-of keygen tokens together to create a binding management key, Kbm. The mobile node then uses Kbm to generate an authentication code. In particular, the mobile node applies a hash function to input data that includes the mobile node's care-of address, the correspondent node's IPv6 address, and Kbm. The mobile node then send the BU message to the correspondent node with the authentication code that the mobile node generated using Kbm. If the correspondent node is able to validate the BU message by generating the same authentication code using its secret key, Kcn, then the correspondent node sends a BA message as an acknowledgement.

RFC 3775 specifies the use of IPSec to secure Mobile IPv6 signaling messages sent between the mobile node and home agent. With respect to the Return Routability procedure, the basic Mobile IPv6 approach assumes that the confidentiality of the HoTI and HoT messages sent between the mobile node and the home agent is protected by IPSec ESP, such as described in S. Kent and R. Atkinson, "IP Encapsulating Security Payload (ESP)," Request for Comments 2406, November 1998. Thus, according to Section 10.4.6 of RFC 3775, "the home agent MUST support tunnel mode IPSec ESP for the protection of packets belonging to the return routability procedure." However, the process of establishing the security association needed for IPSec ESP can cause an undesirable amount of delay. In addition, when IPSec ESP is used, the mobile node and home agent exchange encrypted messages, and the process of encrypting and decrypting the messages creates an undesirable amount of computational overhead.

An Authentication Protocol, described in A. Patel et al., "Authentication Protocol for Mobile IPv6," Request for Comments 4285, January 2006, has been proposed as an alternative to using IPSec for securing certain types of signaling messages sent between the mobile node and the home agent. However, the Authentication Protocol does not provide confidentiality protection to the HoT and HoTI messages sent between the mobile node and the home agent for the Return Routability procedure. Thus, according to Section 2 of RFC 4285, the Route Optimization mode of Mobile IPv6 should not be used when the Authentication Protocol is used, unless confidentiality protection can be guaranteed in some other way. This is a significant limitation of the Authentication Protocol given the potential benefits of using the route optimized communication.

Accordingly, there is a need for additional methods for securing the messages sent between the mobile node and the home agent for establishing route optimized communication in Mobile IPv6.

SUMMARY

In a first principal aspect, an exemplary embodiment of the present invention provides, in a network in which a correspondent node sends packets to a home address of a mobile node and a home agent sends the packets to a care-of address of the mobile node, a method of authorizing the correspondent node to send future packets to the care-of address of the mobile node. In accordance with the method, first and second initiating message are sent. The first initiating message includes a first test value and an initiating-message authentication code. The second initiating message includes a second test value. First and second responsive messages are received. The first responsive message includes the first test value, a first token, and a responsive-message authentication code. The second responsive message includes the second test value and a second token. A responsive-message key is used to validate the responsive-message authentication code. The first and second tokens are used to generate an authorization-authentication code. An authorization message that authorizes the correspondent node to send future packets to the care-of address of the mobile node is sent. The authorization message includes the authorization-message authentication code.

In a second principal aspect, an exemplary embodiment of the present invention provides, in a network in which a correspondent node sends packets to a home address of a mobile node and a home agent sends the packets to a care-of address of the mobile node, a method for securing communication between the mobile node and the correspondent node via the home agent. In accordance with the method, an initiating message is received from the mobile node. The initiating message includes an initiating-message authentication code. An initiating-message key is used to validate the initiating-message authentication code. The initiating-message authentication code is removed from the initiating message to provide a modified initiating message. The modified initiating message is sent to the correspondent node. A responsive message is received from the correspondent node. A responsive-message key is used to generate a responsive-message authentication code. The responsive-message authentication code is added to the responsive message to provide a modified responsive message. The modified responsive message is sent to the mobile node.

DETAILED DESCRIPTION OF EXEMPLARY EMBODIMENTS

1. Overview

The present invention, in its exemplary embodiments, provides methods for securing one or more messages sent between the mobile node and the home agent during a process for establishing a route optimized mode of communication between the mobile node and a correspondent node. The one or more messages may include, for example, the Home Test Init (HoTI) message and/or the Home Test (HoT) message used in the Mobile IPv6 Return Routability procedure.

The mobile node may secure the HoTI message by including an initiating-message authentication code that can be validated by either the home agent or by an authentication server. The mobile node may generate the initiating-message authentication code by applying an algorithm that hashes an initiating-message key together with other input data. The initiating-message key could be a shared secret that is shared by the mobile node and the home agent or by the mobile node and the authentication server, depending on whether validation is to be performed by the home agent or by an authentication server. When the home agent receives the HoTI message from the mobile node, either the home agent or authentication server attempts to validate the initiating-message authentication code. If validated, the home agent removes the initiating-message authentication code from the HoTI message and sends the modified HoTI message to the correspondent node.

The home agent may secure the HoT message by adding a responsive-message authentication code that can be validated by the mobile node. The home agent may generate the responsive-message authentication code by applying an algorithm that hashes a responsive-message key together with other input data. The responsive-message key could be a shared secret that is shared by the mobile node and the home agent. When the home agent receives the HoT message from the correspondent node, the home agent adds the responsive-message authentication code and sends the modified HoT message to the mobile node. The mobile node receives the HoT message and attempts to validate the responsive-message authentication code. If validated, the mobile node may send a Binding Update (BU) message to the correspondent node, authorizing the correspondent node to send packets to the mobile node's care-of address.

The home agent may further secure the HoT message by encrypting the home keygen token. The home agent may encrypt the home keygen token by applying an encryption algorithm to the home keygen token and an encryption key. The encryption key could be a shared secret that is shared by the mobile node and the home agent. For example, the encryption key could also be the responsive-message authentication key. In this way, the mobile node may use the responsive-message authentication key to validate the responsive-message authentication code and to decrypt the encrypted home keygen token.

In this way, the HoTI and HoT messages sent between the mobile node and the home agent may be secured without using IPSec.

2. Exemplary Network Architecture

Figure 3:
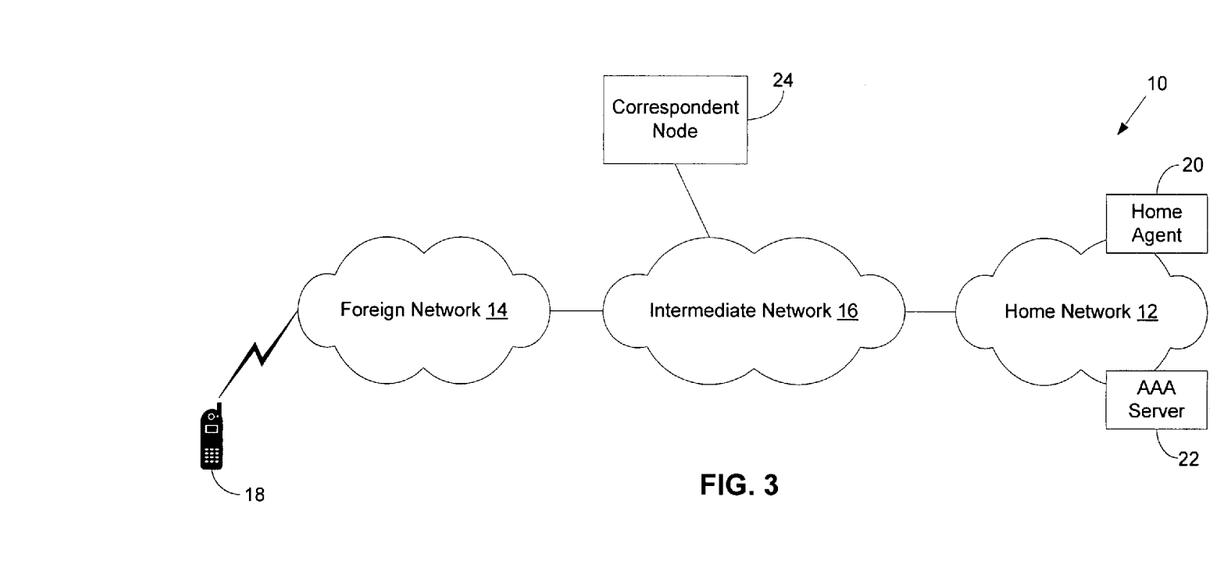
FIG. 3 is a block diagram of a network architecture, in accordance with an exemplary embodiment of the present invention.

FIG. 3 is a block diagram of a network architecture 10, in which exemplary embodiments of the present invention may be employed. Network architecture 10 may include a home network 12 and a foreign network 14, which may be communicatively coupled via an intermediate network 16. Networks 12, 14, and 16 are packet-switched networks that route packets based on network addresses, for example, using the Internet Protocol.

A mobile node 18 may be associated with home network 12. For example, mobile node 18 may have a home address that is within the address space of home network 12. However, mobile node 18 may change its point of attachment within network architecture 10. Thus, mobile node 18 may be connected to home network 12 at one time but then may be connected to foreign network 14 at a later time. In the example illustrated in FIG. 3, mobile node 18 is connected to foreign network 14.

Mobile node 18 may communicate with foreign network 14 via either a wireless or wireline interface. For example, mobile node 18 could be a wireless telephone, wireless personal digital assistant (PDA), wirelessly-equipped laptop computer or other type of wireless communication device. To provide wireless communication with mobile node 18, foreign network 14 might include, for example, a wireless local area network (WLAN) and/or a wireless wide area network (WWAN). A WLAN in foreign network 14 may communicate with mobile node 18 using an air interface format such as IEEE 802.11, IEEE 802.16, Bluetooth, HomeRF, or HiperLAN. A WWAN in foreign network 14 may communicate with mobile node 18 using an air interface format such as cdma2000, EVDO, or GSM/GPRS. Alternatively, mobile node 18 may communicate with foreign network 14 via a wireline connection, e.g., using a cable modem or DSL modem.

Despite changes in the network connectivity of mobile node 18, packets addressed to the home address of mobile node 18 may still reach mobile node 18. For example, when mobile node 18 is away from home network 12, mobile node 18 may register a care-of address associated with its current point of connection with a home agent 20 in home network 12. Thus, with mobile node 18 connected to foreign network 14, as shown in FIG. 3, mobile node 18 may have a care-of address associated with foreign network 14 registered with home agent 20. As a result, packets addressed to the home agent of mobile node 18 may be routed to or intercepted by home agent 20, and home agent 20 may then send the packets to the care-of address of mobile node 18. In an exemplary embodiment, this mobility support is provided in accordance with Mobile IPv6, e.g., as described in RFC 3775.

Home agent 20 may communicate with other network elements to support the mobility of mobile node 18. For example, home agent 20 may communicate with an authentication, authorization, and accounting (AAA) server 22 in home network 12. Home agent 20 may communicate with AAA server 22 in order to validate messages sent by mobile node 18, for example, using a RADIUS or Diameter protocol. A recent version of the RADIUS protocol is described in C. kigney et al., "Remote Authentication Dial In User Service (RADIUS)," Request for Comments 2865, June 2000, which is incorporated herein by reference. In an exemplary embodiment, home agent 20 and AAA server 22 communicate via a secure channel. The secure channel may be achieved in various ways. For example, home agent 20 and AAA server 22 may be within the same administrative domain of home network 12.

Mobile node 18 may communicate with other endpoints using Mobile IPv6. For example, mobile node 18 may communicate with a correspondent node 24. For purposes of illustration, FIG. 3 shows correspondent node 24 connected to intermediate network 16. However, it is to be understood that correspondent node 24 could alternatively be connected to foreign network 14 or to home network 12.

In accordance with Mobile IPv6, correspondent node 24 may communicate with mobile node 18 in one of two modes. In the first communication mode, correspondent node 24 sends packets to the home address of mobile node 18. Home agent 20 would receive such packets and then send them to mobile node 18. In the second communication mode, correspondent node 24 sends packets to the care-of address of mobile node 18.

With mobile node 18 connected to foreign network 14 and correspondent node 24 connected to intermediate network 16, as shown in FIG. 3, packets sent by correspondent node 24 would follow different paths, depending on which communication mode is used. In the first communication mode, packets from correspondent node 24 would traverse intermediate network 16 and home network 12 to reach home agent 20. From home agent 20, the packets would then traverse home network 12, intermediate network 16, and foreign network 14 to reach mobile node 18. However, in the second communication mode, packets from correspondent node 24 would traverse only intermediate network 16 and foreign network 14 to reach mobile node 18. Thus, packets would be expected to travel along a shorter path in the second communication mode.

In this way, the second communication mode may provide for "route optimized" communication between mobile node 18 and correspondent node 24, with associated benefits such as reduced latency and improved reliability. This second, route optimized communication mode may be established using the exemplary Return Routability procedure described below.

3. Exemplary Return Routability Procedure

In an exemplary embodiment, the Return Routability procedure for establishing route optimized communication is carried out using the Mobile IPv6 HoTI, CoTI, HoT, and CoT messages described in RFC 3775, but with the addition of one or more instances of a Return Routability Security Option in the HoTI and HoT messages sent between the mobile node and the home agent.

a. Exemplary Return Routability Security Option

In an exemplary embodiment, the Return Routability Security Option is in the form of a Mobility Option in the Mobility Header, as set forth in RFC 3775. As illustrated schematically in FIG. 4, a Return Routability Security Option may consist of the following fields: (1) an 8-bit Option Type, (2) an 8-bit Option Length, (3) an 8-bit Subtype, (4) a 32-bit Security Parameter Index, and (5) Security Data.

Figure 4:
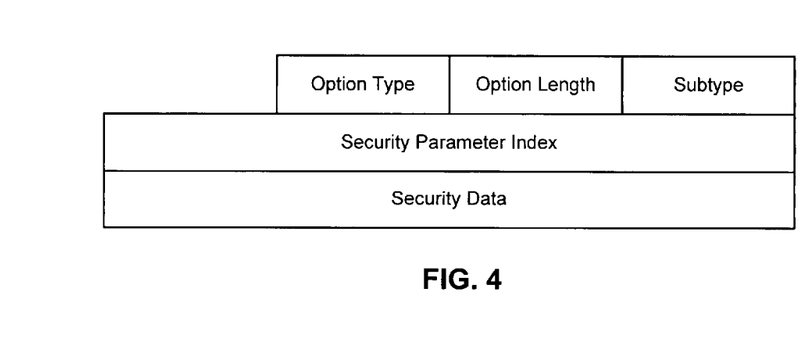
FIG. 4 is a block diagram illustrating the fields in a Return Routability Security Option, in accordance with an exemplary embodiment of the present invention.

The Option Type may be an 8-bit unsigned integer that is used to indicate a Return Routability Security Option. The value of this integer may be specified by an organization, such as the Internet Assigned Numbers Authority (IANA), or it may be kept proprietary.

The Option Length may be an 8-bit unsigned integer that specifies the length in octets of the subsequent fields in the Return Routability Security Option, i.e., the Subtype, Security Parameter Index, and Security Data fields.

The Subtype field holds a value that indicates what type of data is present in the Security Data field. In the exemplary embodiment described herein, the Subtype value can be either 1, 2, or 3. Subtype 1 indicates that the Security Data field contains an authentication code that has been generated using a key shared by the mobile node and the home agent (an "MN-HA key"). Subtype 2 indicates that the Security Data field contains an authentication code that has been generated using a key that is shared by the mobile node and an authentication server, such as AAA server 22 (an "MN-AAA key"). Subtype 3 indicates that the Security Data field contains an encrypted home keygen token that has been encrypted using an MN-HA key. It is to be understood that these Subtypes are exemplary only, as other Subtypes could be specified.

The Security Parameter Index (SPI) field holds a value that indicates what algorithm Was used to generate the data in the Security Data field. For example, the SPI field may hold a value that indicates that the well known keyed-hashing algorithm HMAC_SHA1 was used, or the SPI field may hold a value that indicates that the Well known encryption algorithm RC2 was used. The SPI field values may be specified by an organization, such as IANA, or they may be kept proprietary.

The HMAC_SHA1 algorithm uses the well known hash function SHA-1, as described in H. Krawczyk, "HMAC: Keyed-Hashing for Message Authentication," Request for Comments 2104, February 1997 (hereinafter "RFC 2104"), which is incorporated herein by reference. The SHA-1 hash function is described in U.S. Department of Commerce, National Institute of Standards and Technology, "Secure Hash Standard," Federal Information Processing Standards Publication, FIPS PUB 180-1, April 1995 (hereinafter "FIPS 180-1"), which is incorporated herein by reference. The RC2 encryption algorithm is described in R. Rivest, "A Description of the RC2(r) Encryption Algorithm," Request for Comments 2268, March 1998 (hereinafter "RFC 2268"), which is incorporated herein by reference.

The Security Data field contains data in accordance with the values contained in the Subtype and SPI fields. Thus, in an exemplary embodiment, the Security Data field could contain either an authentication code (Subtypes 1 and 2) or an encrypted home keygen token (Subtype 3). The length of the Security Data field may depend on the Subtype. For example, the Security Data field may be 96-bits long for Subtypes 1 and 2 and may be 128-bits long for Subtype 3. Particular expressions that may be used to generate the data in the Security Data field are set forth below.

For Subtype 1, the data in the Security Data field is an authentication code that may be generated in accordance with the following expression:

Authentication Code=SPI_Alg(MN-HA Shared Key, (care-of address|home address|MH Data))

In the above expression, "SPI_Alg" is the algorithm specified in the SPI field (e.g., the HMAC_SHA1 algorithm described in RFC 2104), "MN-HA Shared Key" is a key shared by the mobile node and the home agent, "care-of address" is the care-of address of the mobile node to which the correspondent node is to send packets for routed optimized communication, "home address" is the mobile node's home address registered with the home agent, and "MH Data" is the content of the Mobility Header up to and including the SPI field. As used herein, the "|" symbol denotes concatenation.

For Subtype 2, the data in the Security Data field is an authentication code that may be generated in accordance with the following expression:

Authentication Code=SPI_Alg(MN-AAA Shared Key, SHA1(care-of address|home address|MH Data))

In the above expression, "SPI_Alg" is the algorithm specified in the SPI field (e.g., the HMAC_SHA1 algorithm described in RFC 2104), "MN-AAA Shared Key" is a key shared by the mobile node and the AAA server, "SHA1" is the SHA-1 algorithm described in FIPS 180-1, "care-of address" is the care-of address of the mobile node to which the correspondent node is to send packets for routed optimized communication, "home address" is the mobile node's home address registered with the home agent, and "MH Data" is the content of the Mobility Header up to and including the SPI field.

For Subtype 3, the data in the Security Data field is an encrypted token that may be generated in accordance with the following expression:

Encrypted Token=SPI_Alg(MN-HA Shared Key, Token)

In the above expression, "SPI_Alg" is the algorithm specified in the SPI field (e.g., the RC2 encryption algorithm described in RFC 2268), "MN-HA Shared Key" is a key shared by the mobile node and the home agent, and "Token" is the home keygen token provided by the correspondent node in the HoT message.

It is to be understood that multiple instances of the Return Routability Security Option may be present in a given message. For example, a HoT message might include a first Return Routability Security Option of Subtype 1, with a Security Data field containing an authentication code generated using an MN-HA key, and a second Return Routability Security Option of Subtype 3, with a Security Data field containing an encrypted home keygen token that has been encrypted using the MN-HA key.

b. Exemplary Return Routability Message Processing

Figure 5:
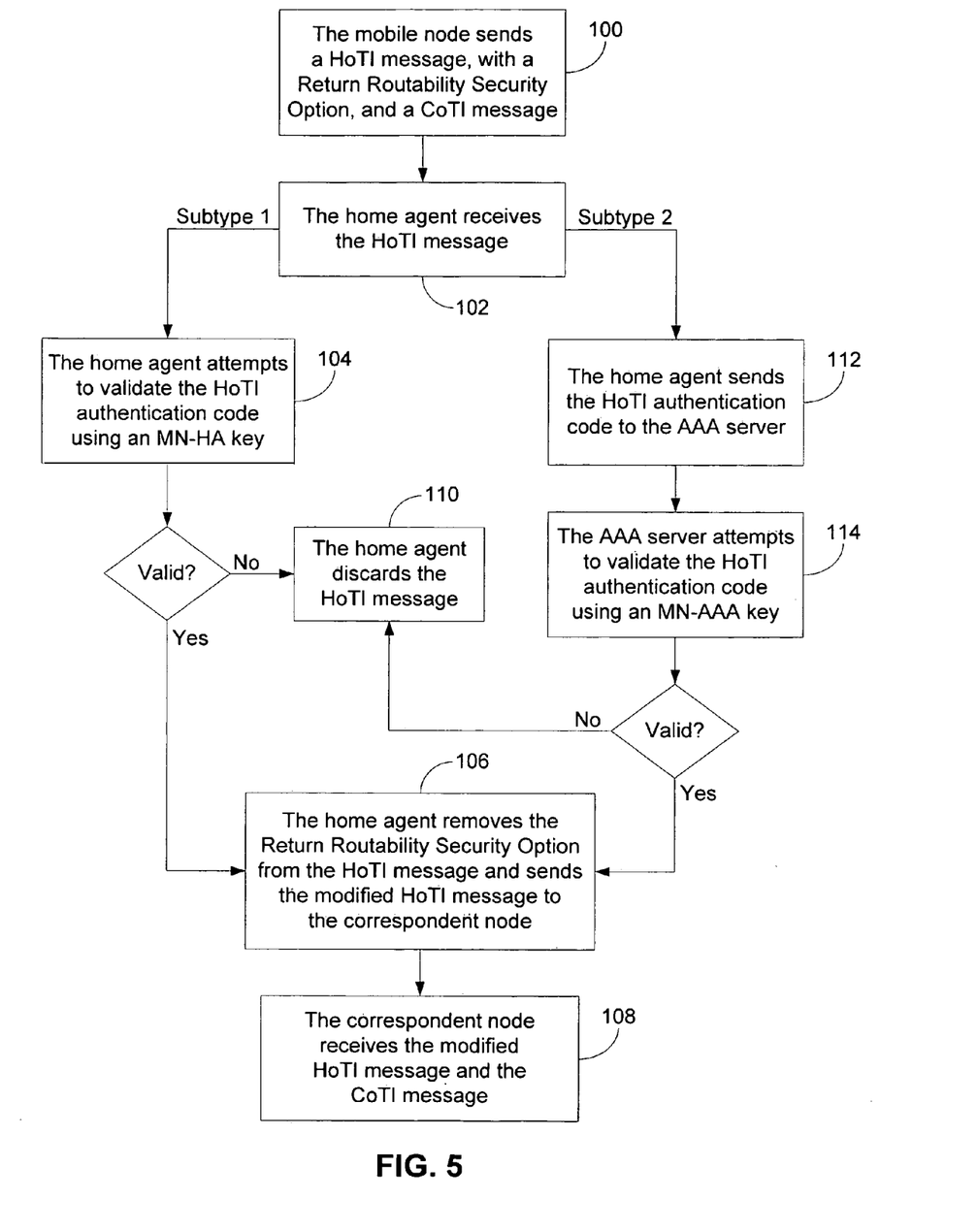
FIG. 5 is a flow chart illustrating a first part of a method for establishing a route optimized communication mode, in accordance with an exemplary embodiment of the present invention.
Figure 6:
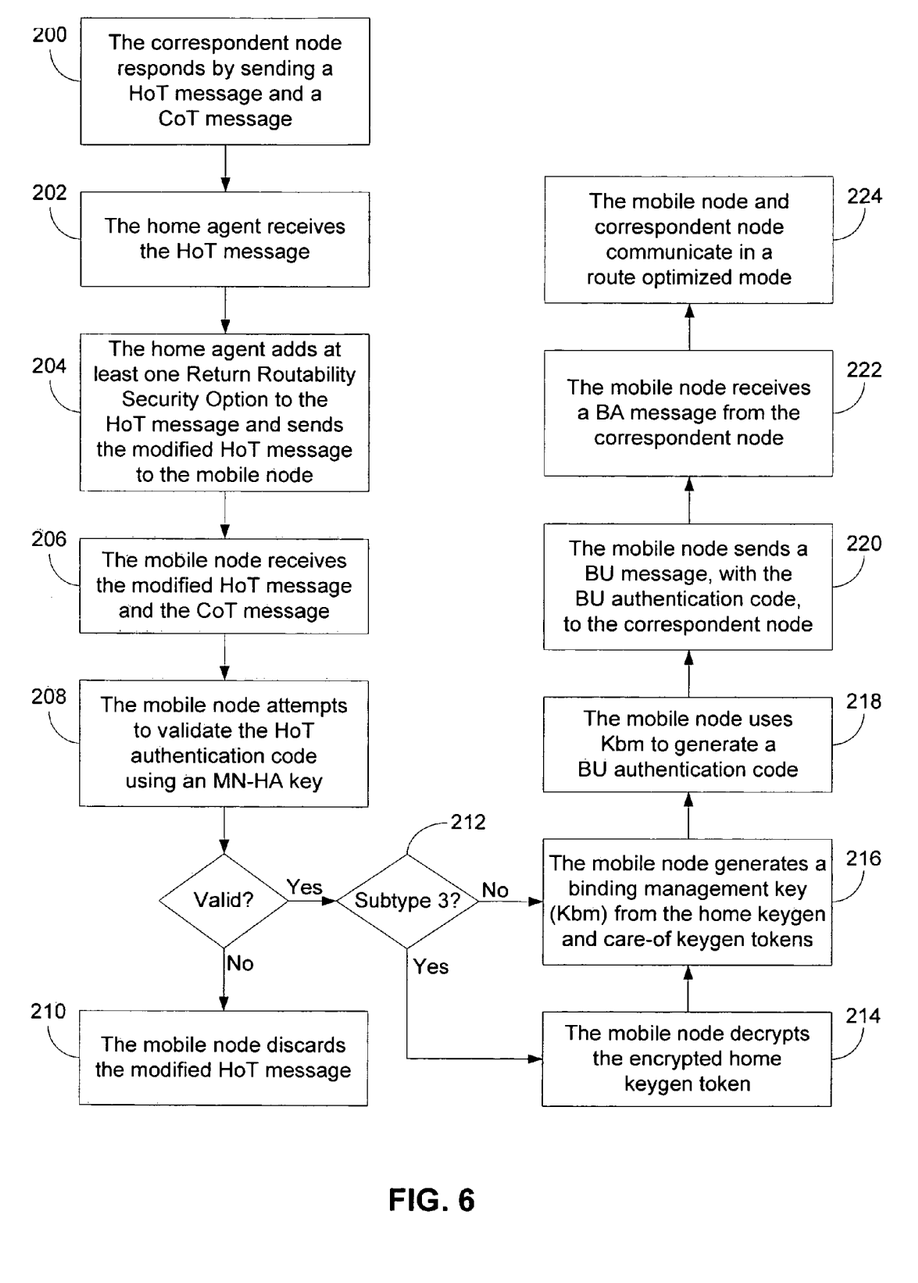
FIG. 6 is a flow chart illustrating a second part of a method for establishing a route optimized communication mode, in accordance with an exemplary embodiment of the present invention.

FIG. 2 illustrates the sequence of messages used in the Return Routability procedure. FIGS. 5 and 6 are flow charts illustrating an exemplary method for processing the Return Routability messages.

With reference to FIG. 5, the mobile node may initiate the Return Routability procedure by sending a HoTI message and a CoTI message, as indicated by block 100. The mobile node may address the HoTI message so that is sent to the correspondent node via the home agent. The mobile node may address the CoTI message so that is sent to the correspondent node directly.

The HoTI message may include a home init cookie, and the CoTI message may include a care-of init cookie, e.g., as specified in RFC 3775. In addition, the HoTI message may include a Return Routability Security Option, with Subtype 1 or Subtype 2, as described above. For Subtype 1, the mobile node may generate a HoTI authentication code using an MN-HA key, in accordance with the exemplary Subtype 1 expression set forth above. Thus, the mobile node may generate the HoTI authentication code by applying an algorithm, such as the HMAC_SHA1 algorithm, that hashes the MN-HA key together with other input data. For Subtype 2, the mobile node may generate a HoTI authentication code using an MN-AAA key, in accordance with the exemplary Subtype 2 expression set forth above. Thus, the mobile node may generate the HoTI authentication code by applying an algorithm, such as the HMAC_SHA1 algorithm, that hashes the MN-AAA key together with other input data. The mobile node puts the HoTI authentication code (generated for either Subtype 1 or Subtype 2) in the Security Data field.

When Subtype 2 is used, the mobile node may also include a Mobile Node Identifier Option in the HoTI message. This Option is described in A. Patel et al., "Mobile Node Identifier Option for Mobile IPv6 (MIPv6)," Request for Comments 4283, November 2005, which is incorporated herein by reference. The Mobile Node Identifier Option includes an identifier of the mobile node, such as a Network Access Identifier (NAI), so that the AAA server can determine which MN-AAA key to use to validate the Subtype 2 HoTI authentication code.

The home agent receives the HoTI message, as indicated by block 102. To determine how to process the HoTI message, the home agent may check the Subtype field of the Return Routability Security Option. In this example, the Subtype is either 1 or 2.

For Subtype 1, the home agent attempts to validate the HoTI authentication code using an MN-HA key, as indicated by block 104. To do this, the home agent may generate an expected value, using the same algorithm, MN-HA key, and other input data as the mobile node was supposed to have used. The home agent then compares the expected value to the HoTI authentication code. If there is a match, then the HoTI authentication code is valid. Otherwise, the HoTI authentication code is invalid.

If the HoTI authentication code is valid, then the home agent removes the Return Routability Security Option from the HoTI message and sends the modified HoTI message to the correspondent node, as indicated by block 106. The correspondent node may then receive the modified HoTI message and the CoTI message, as indicated by block 108. On the other hand, if the HoTI authentication code is not valid, then the home agent may discard the HoTI message, as indicated by block 110.

For Subtype 2, the home agent sends the HoTI authentication code to the AAA server, as indicated by block 112. For example, the home agent may send a RADIUS Access-Request message to the AAA server. The AAA server then attempts to validate the HoTI authentication code using an MN-AAA key, as indicated by block 114. The AAA server may do this by generating an expected value, using the same algorithm, MN-AAA key, and other input data as the mobile node was supposed to have used, and then comparing the expected value to the HoTI authentication code. If there is a match, then the HoTI authentication code is valid. Otherwise, the HoTI authentication code is invalid.

If the HoTI authentication code is valid, then the AAA server may so notify the home agent, e.g., by sending a RADIUS Access-Accept message to the home agent. The home agent may then remove the Return Routability Security Option from the HoTI message and send the modified HoTI message to the correspondent node (block 106) so that the correspondent node receives the modified HoTI message and the CoTI message (block 108).

With reference to FIG. 6, after the correspondent node receives the modified HoTI message and the CoT message, the correspondent node may respond by sending a HOT message and a CoT message, as indicated by block 200. To properly respond to the HoTI message, the correspondent node includes the home init cookie in the HoT message. To properly respond to the CoTI message, the correspondent node includes the care-of init cookie in the CoT message. In addition, the correspondent node includes a home keygen token in the HoT message and a care-of keygen token in the CoT message. The correspondent node may send the HoT message to the mobile node's home address and may send the CoT message to the mobile node's care-of address.

The home agent receives the HoT message as indicated by block 202. To secure the HoT message, the home agent adds at least one Return Routability Security Option to the HoT message and sends the modified HoT message to the mobile node, as indicated by block 204. In particular, the home agent may include a Return Routability Security Option with Subtype 1. Thus, the home agent may generate a HoT authentication code using an MN-HA key, in accordance with the exemplary Subtype 1 expression set forth above. For example, the home agent may generate the HoT authentication code by applying an algorithm, such as the HMAC-_SHA1 algorithm, that hashes the MN-HA key together with other input data. The home agent then puts the HoT authentication code into the Security Data field.

The home agent may also include a Return Routability Security Option with Subtype 3. Thus, the home agent may generate an encrypted home keygen token by applying an encryption algorithm, such as the RC2 algorithm, to the MN-HA key and the home keygen token provided by the correspondent node. The home agent places the encrypted home keygen token into the Security Date field. The home agent may also delete the original, unencrypted home keygen token in the HoT message, e.g., by overwriting it with zeroes. In this way, the home agent may send a HoT message to the mobile node that includes the home keygen token in only the encrypted form, so as to protect the home keygen token from eavesdropping.

The mobile node receives the modified HoT message and the CoT message, as indicated by block 206. The mobile node then attempts to validate the HoT authentication code using an MH-HA key, as indicated by block 208. To do this, the mobile node may generate an expected value, using the same algorithm, MN-HA key, and other input data as the home agent was supposed to have used. The mobile node then compares the expected value to the HoT authentication code. If there is a match, then the HoT authentication code is valid. Otherwise, the HoT authentication code is invalid.

If the HoT authentication code is invalid, then the mobile node may discard the modified HoT message, as indicated by block 210. If, however, the HoT authentication code is valid, then the mobile node may determine whether the HoT message also contains a Subtype 3 Return Routability Security Option, as indicated by block 212. If the Subtype 3 Option is present, then the mobile node decrypts the encrypted home keygen token, e.g., using the MN-HA key as a decryption key, as indicated by block 214.

Once the mobile node has obtained the home keygen token, either by obtaining it directly from the HoT message (when the Subtype 3 Option is not present) or by decrypting the encrypted home keygen token (when the Subtype 3 Option is present), the mobile node generates a binding management key (Kbm). The mobile node may generate Kbm from the home keygen and care-of tokens, as indicated by block 216. For example, the mobile node may hash the tokens together in accordance with the following expression:

$$Kbm=SHA1(\text{home keygen token}|\text{care-of keygen token})$$

In the above expression, "SHA1" is the SHA-1 algorithm described in FIPS 180-1, "home keygen token" is the unencrypted or decrypted home keygen token from the HoT message, and "care-of keygen token" from the CoT message.

The mobile node may then use Kbm to generate a Binding Update (BU) authentication code, as indicated by block 218. The mobile node may do this in accordance with Binding Authorization Data option set forth in RFC 3775. Thus, the mobile node may use the following expression:

$$\text{BU Authentication Code}=\text{First\_96}(\text{HMAC\_SHA1}(Kbm, \text{care-of address}|\text{correspondent}|\text{MH Data}))$$

In the above expression, "First_96" indicates that the first 96 bits are used, "HMAC_SHA1" is the keyed-hashing algorithm described in RFC 2104, "Kbm" is the binding management key that the mobile node generated, "care-of address" is the care-of address of the mobile node to which the correspondent node is to send packets for route optimized communication, "correspondent" is the IPv6 address of the correspondent node, and "MH Data" is the content of the Mobility Header exclusive of the BU Authentication Code.

The mobile node may then send a Binding Update (BU) message, with the BU authentication code, to the correspondent node, as indicated by block 220. The BU message authorizes the correspondent node to send packets to the mobile node's care-of address for route optimized communication. The mobile node may then receive a Binding Acknowledgement (BA) message from the correspondent node, as indicated by block 222. At that point, the mobile node and correspondent node may communicate in a route optimized mode, as indicated by block 224. In this route optimized mode, the correspondent node sends packets to the mobile node's care-of address and the mobile node sends packets to the correspondent node's address, without going through the home agent.

In this way, the Return Routability Security Option may be used to secure the HoTI and HOT messages sent between the mobile node and the home agent, without using IPSec.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. In a network in which a correspondent node sends packets to a home address of a mobile node and a home agent sends the packets to a care-of address of the mobile node, a method of authorizing the correspondent node to send future packets to the care-of address of the mobile node, the method comprising the steps of:

generating an initiating-message authentication code by applying an initiating-message algorithm that hashes first input data, wherein the first input data includes an initiating-message key;

sending a first initiating message, the first initiating message including a first test value and the initiating-message authentication code;

sending a second initiating message, the second initiating message including a second test value;

receiving a first responsive message, the first responsive message including the first test value, a first token, and a responsive-message authentication code;

receiving a second responsive message, the second responsive message including the second test value and a second token;

using a responsive-message key to validate the responsive-message authentication code;

using the first and second tokens to generate an authorization-message authentication code;

sending an authorization message that authorizes the correspondent node to send future packets to the care-of address of the mobile node, wherein the authorization message includes the authorization-message authentication code.

2. The method of claim 1, wherein the first initiating message is an IPv6 Home Test Init (HoTI) message, the second initiating message is an IPv6 Care-of Test Init (CoTI) message, the first responsive message is an IPv6 Home Test Init (Hot) message, the second responsive message is an IPv6 Care-of Test (CoT) message, and the authorization message is an IPv6 Binding Update (BU) message.

3. The method of claim 1, wherein using a responsive-message key to validate the responsive-message authentication code comprises:

generating an expected value by applying a validation algorithm that hashes second input data, wherein the second input data includes the responsive-message key; and comparing the expected value to the responsive-message authentication code.

4. The method of claim 3, wherein the responsive-message key is shared by the mobile node and the home agent.

5. The method of claim 4, wherein the first token is encrypted in the first responsive message, further comprising:

using the responsive-message key to decrypt the first token.

6. The method of claim 5, wherein the first token is decrypted before being used to generate the authorization-authentication code.

7. The method of claim 1, wherein using the first and second tokens to generate an authorization-message authentication code comprises:

hashing the first and second tokens together to generate a management key; and generating the authorization-message authentication code by applying an authorization-message algorithm that hashes third input data, wherein the third input data includes the management key.

8. The method of claim 1, wherein the initiating-message key is shared by the mobile node and the home agent.

9. The method of claim 1, wherein the initiating-message key is shared by the mobile node and an authentication server.

10. In a network in which a correspondent node sends packets to a home address of a mobile node and a home agent sends the packets to a care-of address of the mobile node, a method for securing communication between the mobile node and the correspondent node via the home agent, the method comprising the steps of:

receiving an initiating message from the mobile node, the initiating message including an initiating-message authentication code;

using an initiating-message key to validate the initiating-message authentication code, wherein using an initiating-message key to validate the initiating-message authentication code comprises:

generating an expected value by applying a validation algorithm that hashes first input data, wherein the first input data includes the initiating-message key, and     comparing the expected value to the initiating-message authentication code;

removing the initiating-message authentication code from the initiating message to provide a modified initiating message;

sending the modified initiating message to the correspondent node;

receiving a responsive message from the correspondent node;

using a responsive-message key to generate a responsive-message authentication code;

adding the responsive-message authentication code to the responsive message to provide a modified responsive message; and sending the modified responsive message to the mobile node.

11. The method of claim 10, wherein the initiating-message key is the same as the responsive-message key.

12. The method of claim 10, wherein the initiating-message key is shared by the mobile node and the home agent.

13. The method of claim 10, wherein the initiating-message key is shared by the mobile node and an authentication server.

14. The method of claim 13, further comprising:

the home agent sending the initiating-message authentication code to the authentication server.

15. The method of claim 10, wherein using a responsive-message key to generate a responsive-message authentication code comprises:

generating the responsive-message authentication code by applying a responsive-message algorithm that hashes second input data, wherein the second input data includes the responsive-message key.

16. The method of claim 15, wherein the responsive-message key is shared by the mobile node and the home agent.

17. The method of claim 10, wherein the responsive message includes a token and the modified responsive message includes an encrypted token, further comprising:

generating the encrypted token by applying an encryption algorithm to the token and an encryption key.

18. The method of claim 17, wherein the encryption key is shared by the mobile node and the home agent.

* * * * *